(12) United States Patent
Neela et al.

(10) Patent No.: US 11,189,000 B2
(45) Date of Patent: Nov. 30, 2021

(54) ARCHITECTURE TO GENERATE BINARY DESCRIPTOR FOR IMAGE FEATURE POINT

(71) Applicant: Intel Corporation, Santa Clara, CA (US)

(72) Inventors: Gopi Neela, Bengaluru (IN); Dipan Kumar Mandal, Bangalore (IN); Gurpreet S. Kalsi, Bangalore (IN); Prashant Laddha, Bangalore (IN); Om J. Omer, Bangalore (IN); Anirud Thyagharajan, Bengaluru (IN); Srivatsava Jandhyala, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 16/449,896

(22) Filed: Jun. 24, 2019

(65) Prior Publication Data
US 2019/0333183 A1   Oct. 31, 2019

(51) Int. Cl.
| | |
|---|---|
| *G06T 1/20* | (2006.01) |
| *G06K 9/62* | (2006.01) |
| *G06K 9/52* | (2006.01) |
| *G06T 1/60* | (2006.01) |
| *G06T 7/73* | (2017.01) |

(52) U.S. Cl.
CPC ............. *G06T 1/20* (2013.01); *G06K 9/525* (2013.01); *G06K 9/6261* (2013.01); *G06T 1/60* (2013.01); *G06T 7/73* (2017.01)

(58) Field of Classification Search
None
See application file for complete search history.

(56) References Cited

U.S. PATENT DOCUMENTS

| | | | |
|---|---|---|---|
| 2016/0196665 A1* | 7/2016 | Abreu | G06T 7/251 345/427 |
| 2017/0024877 A1* | 1/2017 | Versace | G06K 9/3241 |
| 2018/0012105 A1* | 1/2018 | Fan | G06K 9/00664 |
| 2018/0321776 A1* | 11/2018 | Averyanov | G06F 3/048 |
| 2020/0005487 A1* | 1/2020 | Jiang | H04W 8/02 |
| 2020/0125884 A1* | 4/2020 | Sung | G06K 9/42 |
| 2020/0184170 A1* | 6/2020 | Reza | G06K 7/1443 |
| 2020/0279396 A1* | 9/2020 | Komissarov | G06F 3/011 |

* cited by examiner

*Primary Examiner* — Santiago Garcia
(74) *Attorney, Agent, or Firm* — Essential Patents Group, LLP.

(57) ABSTRACT

An embodiment of an image processor device includes technology to fetch a feature point data set from outside a local memory, locally store three or more fetched feature point data sets in the local memory, compute orientation information for each fetched feature point data set, compute first descriptor information based on the computed orientation information and a first locally stored feature point data set in parallel with a fetch and local store of a second feature point data set in the local memory, and compute second descriptor information based on the computed orientation information and the second locally stored feature point data set in parallel with the compute of the first descriptor information. Other embodiments are disclosed and claimed.

15 Claims, 9 Drawing Sheets

ARCHITECTURE TO GENERATE BINARY DESCRIPTOR FOR IMAGE FEATURE POINT

BACKGROUND

Image feature point descriptors are utilized in a variety of image processing tasks such as augmented reality (AR), virtual reality (VR), merged reality (MR), object recognition and tracking, image retrieval, etc. Such descriptors include, for example, scale-invariant feature transform (SIFT), speeded-up robust features (SURF), binary robust invariant scalable keypoints (BRISK), fast retina keypoint (FREAK), binary robust independent elementary features (BRIEF), and oriented fast and rotated BRIEF (ORB, sometimes also referred to as rBRIEF). SURF and SIFT tend to be more compute, memory, and power intensive, while FREAK, BRIEF, and rBRIEF may be better suited to lower power applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
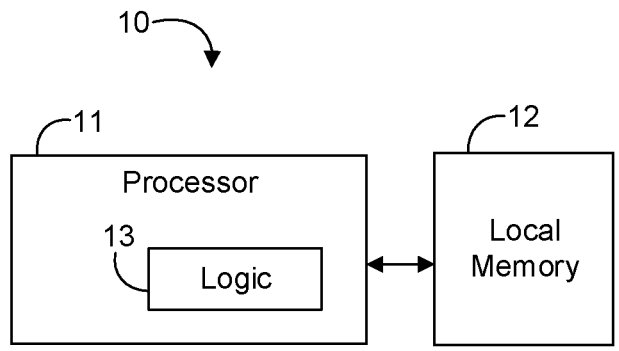
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to image processing systems. More particularly, some embodiments relate to an architecture to generate a binary descriptor for an image feature point. For example, an architecture may fetch some data related to the image feature point and use that feature point data set to compute a different representation as the descriptor for that feature point. In some embodiments, the feature point data set can simply be an image patch around a particular feature point.

In many computer vision algorithms involving image feature detection and tracking including, for example, visual odometry (VO), detected candidate feature points are represented using a descriptor. Descriptors are typically generated based on pixels surrounding a feature point, also referred to as patch. Binary descriptors are a class of descriptors that are composed of three parts: 1) a sampling pattern, 2) orientation compensation, and 3) sampling pairs. An initial sampling pattern is used based on the type of a binary descriptor (e.g., rBRIEF, FREAK, etc.) using which orientation is computed, which is then used to correct the orientation of the feature point. The orientation correction enables a descriptor to be rotation invariant. Once the orientation correction is made, the pixels in sampling pairs are read, the intensities of the pixels within a pair are compared to generate a string of 1s and 0s. Typically, 256 sample pairs are used, and as a result a 256-bit binary string is generated which describes a feature point.

With reference to FIG. 1, an embodiment of an electronic system 10 may include a local memory 12, and a processor 11 directly coupled to the local memory 12. The processor 11 may include logic 13 to fetch a feature point data set from outside the local memory 12, locally store three or more fetched feature point data sets in the local memory 12, compute orientation information for each fetched feature point data set, compute first descriptor information based on the computed orientation information and a first locally stored feature point data set in parallel with a fetch and local store of a second feature point data set in the local memory 12, and compute second descriptor information based on the computed orientation information and the second locally stored feature point data set in parallel with the compute of the first descriptor information. In some embodiments, the logic 13 may be further configured to compute the second descriptor information based on the computed orientation information and the second stored feature point data set in parallel with both the compute of the first descriptor information and a fetch and local store of a third feature point data set in the local memory 12, and compute third descriptor information for the third locally stored feature point data set in parallel with the compute of the second descriptor information. For example, the logic 13 may also be configured to locally store the fetched feature points in the local memory 12 in a round robin fashion based on a storage capacity of the local memory 12, and compute the first, second, and third descriptor information in a round robin fashion based on a feature point to compute ratio. For example, round robin may refer to an arrangement which processes all elements in a group equally in a rational order (e.g., from the top of a list to the bottom of the list, and then starting again at the top of the list and so on). In some embodiments, round robin may refer to a process to take turns, or to process one operation after another in an orderly manner. In some embodiments, the logic 13 may be configured to locally store the fetched feature point data sets in a multi-bank memory arrangement for the local memory 12, and interleave banks of the multi-bank memory arrangement based on the feature point data sets.

In some embodiments, the logic 13 may additionally, or alternatively, be configured to compute the orientation information for each fetched feature point data set on the fly. For example, the logic 13 may be configured to determine a first image moment component and a second image moment component based on multiplication, addition, and accumulation of pixel data, and look up the orientation information in a table based on the determined first and second image moment components. For example, an image moment may correspond to a particular weighted average (e.g., moment) of the image pixel properties (e.g., intensities). Example properties of the image for which image moments may be useful include area (e.g., or total intensity), centroid information, and information about the image orientation. For example, as described in more detail below, the first and second image components may correspond to X and Y components of a vector which points to a centroid of intensity of the feature point data set. The orientation information may correspond to an angle of the vector with the determined X component and the determined Y component (e.g., based on the pixel intensities). In some embodiments, the logic 13 may be further configured to utilize one of a same row index or a same column index to simplify the determination of one of the first image moment component or the second image moment component. For a row-major access of the pixel data (e.g., where X coordinates nominally correspond to image row pixel data), for example, the computation of the Y component may be simplified because the column index is the same for all of the fetched pixels.

Embodiments of each of the above processor 11, local memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, an image processor, a graphic processor, a micro-architecture, a kernel, an execution unit, a general purpose controller, a special purpose controller, a micro-controller, etc.

In some embodiments, the local memory 12 and/or the logic 13, may be located in, or co-located with, various components, including the processor 11 (e.g., on a same die). For example, the logic 13 may be implemented on a semiconductor apparatus which may include one or more substrates, with the logic 13 coupled to the one or more substrates. In some embodiments, the logic 13 may be at least partly implemented in one or more of configurable logic and fixed-functionality hardware logic on semiconductor substrate(s) (e.g., silicon, sapphire, gallium-arsenide, etc.). For example, the logic 13 may include a transistor array and/or other integrated circuit components coupled to the substrate(s) with transistor channel regions that are positioned within the substrate(s). The interface between the logic 13 and the substrate(s) may not be an abrupt junction. The logic 13 may also be considered to include an epitaxial layer that is grown on an initial wafer of the substrate(s).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the local memory 12, persistent storage media, or other system memory may store a set of instructions which when executed by the processor 11 cause the system 10 to implement one or more components, features, or aspects of the system 10 (e.g., the logic 13, fetching the feature point data sets, locally storing three or more fetched feature point data sets in the local memory 12, computing the orientation information for each fetched feature point data set, computing the descriptor information in parallel with each other and in parallel with the fetch and local store of other feature point data sets, etc.).

Figure 2A:
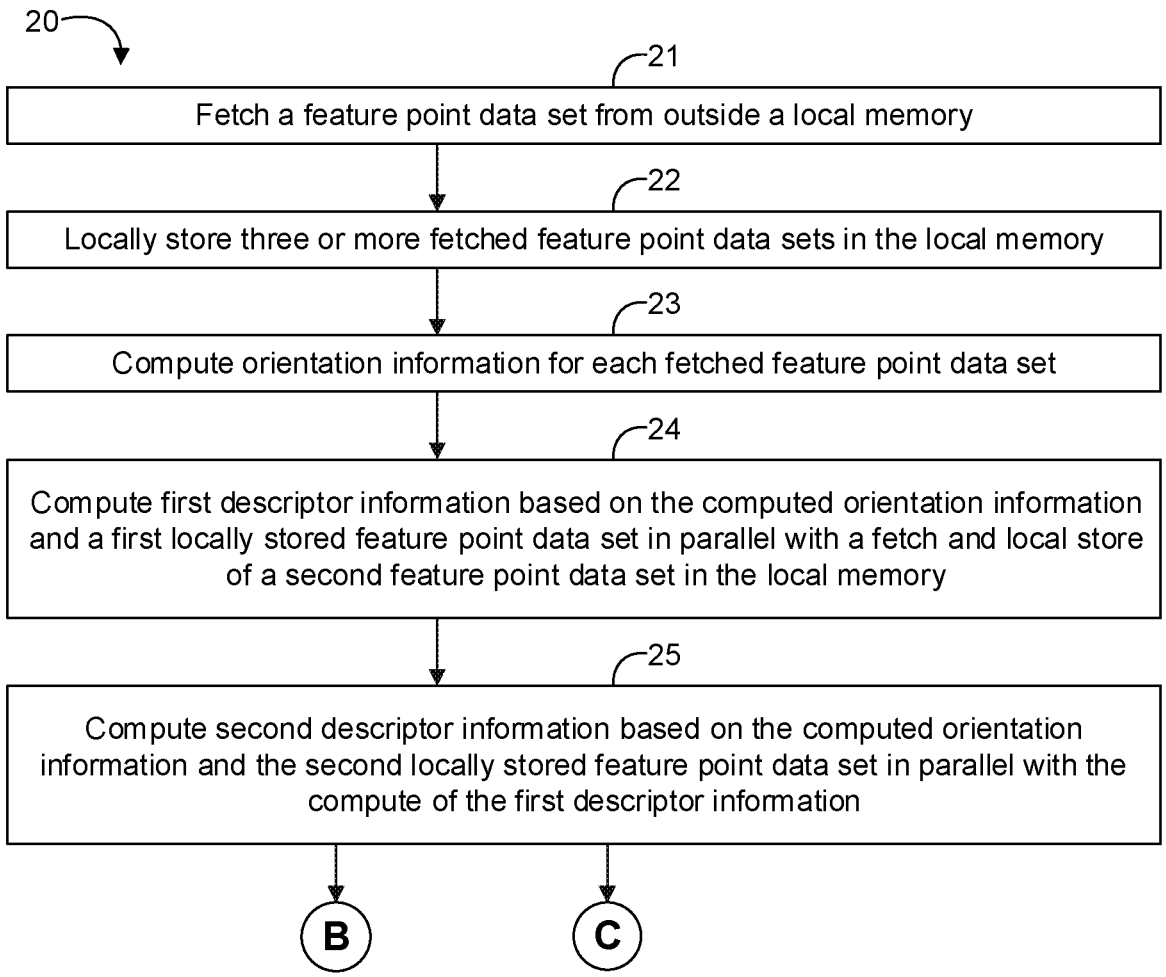
FIGS. 2A to 2C are flowcharts of an example of a method of processing image data according to an embodiment.
Figure 2B:
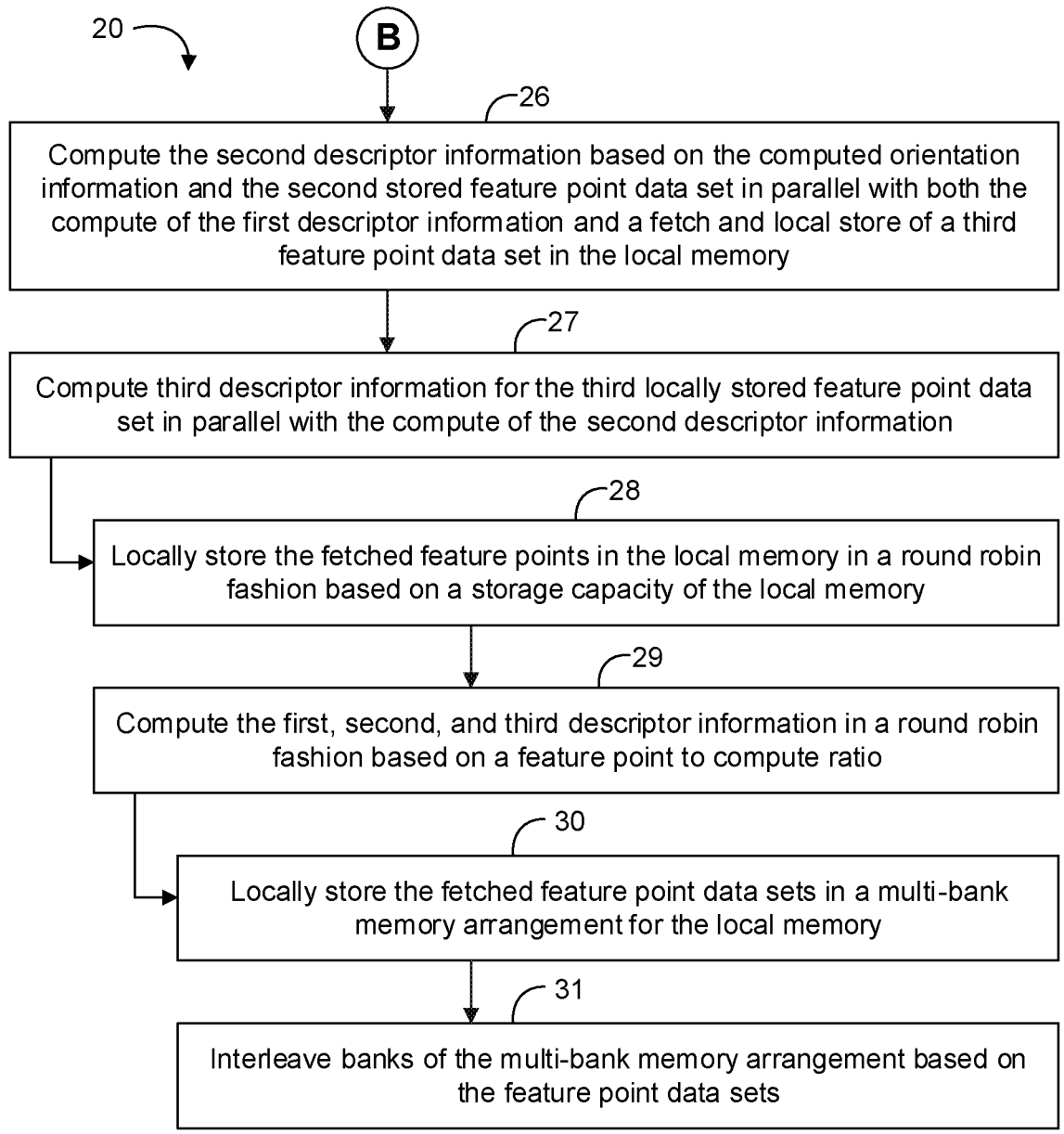
Figure 2C:
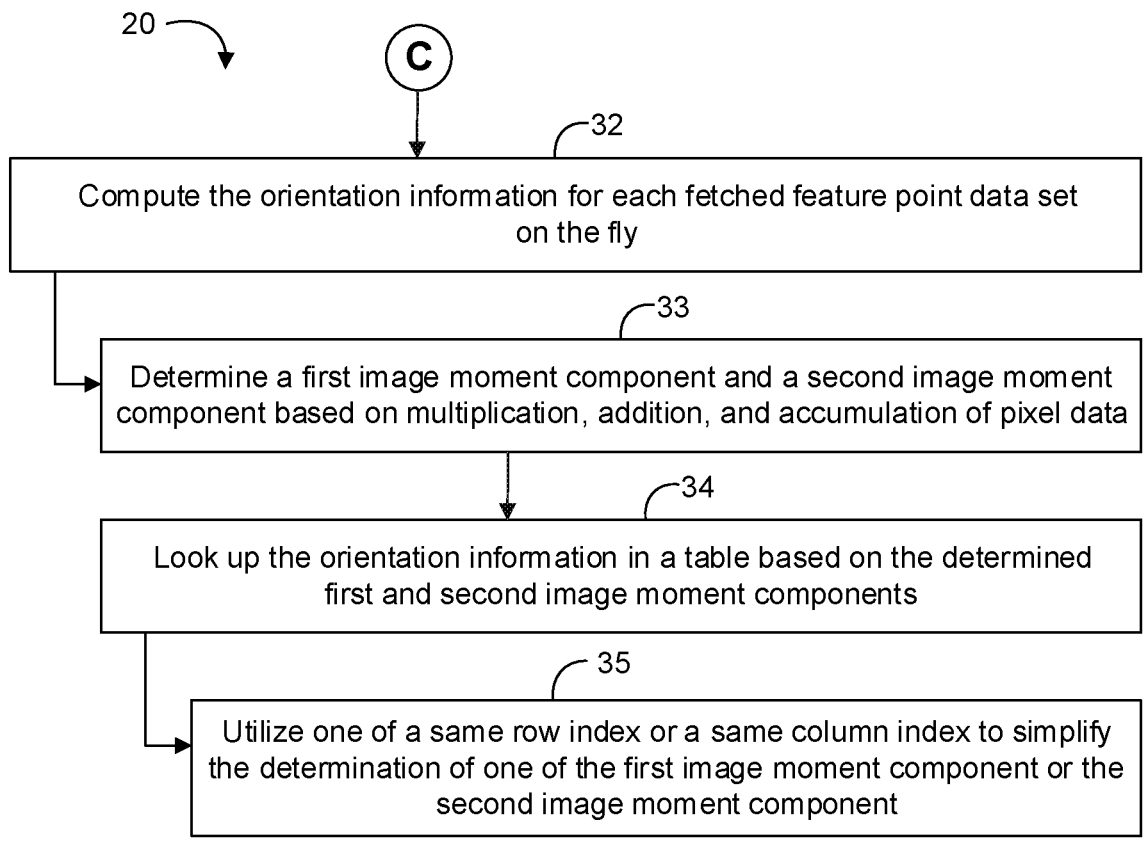

Turning now to FIGS. 2A to 2C, an embodiment of a method 20 of processing image data may include fetching a feature point data set from outside a local memory at block 21, locally storing three or more fetched feature point data sets in the local memory at block 22, computing orientation information for each fetched feature point data set at block 23, computing first descriptor information based on the computed orientation information and a first locally stored feature point data set in parallel with a fetch and local store of a second feature point data set in the local memory at block 24, and computing second descriptor information based on the computed orientation information and the second locally stored feature point data set in parallel with the compute of the first descriptor information at block 25. Some embodiment of the method 20 may further include computing the second descriptor information based on the computed orientation information and the second stored feature point data set in parallel with both the compute of the first descriptor information and a fetch and local store of a third feature point data set in the local memory at block 26, and computing third descriptor information for the third locally stored feature point data set in parallel with the compute of the second descriptor information at block 27. For example, the method 20 may include locally storing the fetched feature points in the local memory in a round robin fashion based on a storage capacity of the local memory at block 28, and computing the first, second, and third descriptor information in a round robin fashion based on a feature point to compute ratio at block 29 (e.g., a feature point fetch time to descriptor compute time ratio). The method 20 may also include locally storing the fetched feature point data sets in a multi-bank memory arrangement for the local memory at block 30, and interleaving banks of the multi-bank memory arrangement based on the feature point data sets at block 31.

Some embodiments of the method 20 may further include computing the orientation information for each fetched feature point data set on the fly at block 32. For example, the method 20 may include determining a first image moment component and a second image moment component based on multiplication, addition, and accumulation of pixel data at block 33, and looking up the orientation information in a table based on the determined first and second image moment components at block 34. The method 20 may also include utilizing one of a same row index or a same column index to simplify the determination of one of the first image moment component or the second image moment component at block 35.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 15 to 21 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide a hardware architecture for generating a binary descriptor of an image feature point. Extraction of feature points (e.g., also referred to as keypoints or corner points) in an image may be an important first step for a wide variety of imaging and computer vision technologies. After a feature point is detected (e.g. using a FASTS corner point detection technique), the feature point may be described precisely and unambiguously for further use in feature point matching, tracking etc. An example technique for describing a feature point is to represent the image characteristics or information in the local neighborhood by a binary descriptor (e.g., also referred to as a binary vector). Describing the feature point with a binary descriptor makes subsequent use of the descriptor fast and compute efficient (e.g., computing distance or matching cost between two such descriptors may utilize an easy-to-compute hamming distance). Computing a robust binary descriptor (e.g. a rotated BRIEF or rBRIEF used in ORB descriptors) involves computation of encoding for local luminance/texture as per a sampling pattern, computing orientation of the feature point, normalizing the luminance/texture vector as per the orientation, etc. These pixel-level operations may have non-contiguous and erratic access patterns, which makes these operations high bandwidth and latency critical. For many applications including, for example, AR/VR, robotics, drone navigation/imaging, etc., latency is of importance along with energy efficiency and real time computation. Some embodiments may provide a hardware microarchitecture that advantageously enables fast and efficient computation of a family of binary descriptors (e.g., including rBRIEF or ORB descriptors) by improving or optimizing pixel fetch bandwidth, and aggressively reusing fetched pixels and computation.

Some other systems may utilize software based running on a CPU or digital signal processor (DSP) core to generate binary descriptors, such as those provided by various libraries in OpenCV. A binary descriptor is typically of size 256-bit, which requires accessing 256 pairs of pixels around a feature point. For example, 512 pixels may be randomly accessed, with potentially both pixels of a pair not falling within a same fetch line. In software solutions fetching 512 data points, computing the descriptor, while storing an intermediate output in memory, and writing the output back memory results in large latency. This latency hinders the performance of applications like feature point tracking that use binary descriptors. Moreover, running such software solutions require powerful generic CPUs to reduce latency, which makes such software solutions impractical in ultra-low-power mobile devices (e.g., such as AV/VR/MR based head mounted displays (HMDs), drones, etc.).

Advantageously, some embodiments provide general hardware microarchitecture technology to generate binary descriptor(s), which makes a reduced or minimum number of memory accesses required (e.g., to the last level cache or dynamic random access memory (DRAM)). Embodiments of the microarchitecture may completely hide computational latency behind memory access latency (e.g., to the fetch path), and may aggressively reuse the fetched pixel data. Advantageously, some embodiments may reduce or minimize the effective bandwidth, execution time (e.g., or the descriptor generation throughput), and compute energy. In particular, some embodiments may include technology for on-the-fly orientation computation, which advantageously avoids re-fetch of pixels, thereby reducing or minimizing bandwidth and energy consumption. Embodiments of the general microarchitecture may be configured for a wide variety of types of binary descriptor (e.g., rBRIEF, FREAK, etc.). Some embodiments may include sufficient local memory within the microarchitecture to ensure that a reduced or only a minimum number of memory accesses from outside the microarchitecture (e.g., system DRAM or last level caches) are made for computing a binary descriptor, further reducing or minimizing bandwidth and energy consumption. Some embodiments may be configurable to: 1) any pixel patch (e.g., receptive field) size around the feature point; 2) any descriptor length; and 3) different pixel widths (e.g., bit depth). Some embodiments may support variable feature point patch size and different descriptor lengths.

Some embodiments may provide fully pipelined operation, which may advantageously hide compute latency behind fetch latency. Some embodiments may also provide technology to support on-the-fly image integral generation (e.g., which may be beneficial or a requirement for binary descriptors like FREAK). Some embodiments may utilize data split logic for an orientation computation, which advantageously avoids a need for dual ported level 1 (L1) static random access memory (SRAM).

Figure 3:
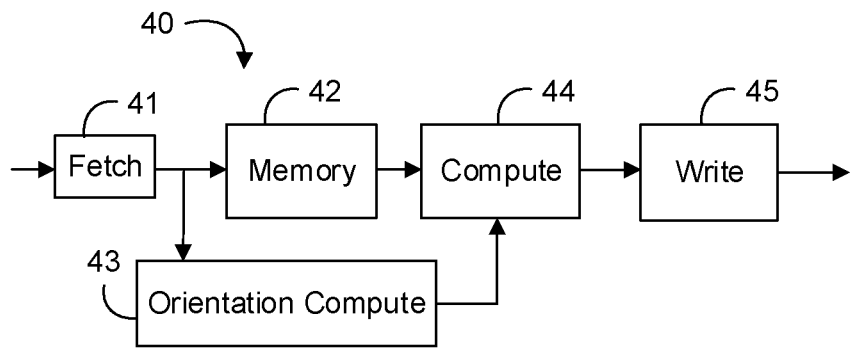
FIG. 3 is a block diagram of an example of a binary descriptor generator according to an embodiment.

Embodiments of the microarchitecture may be physically or logically arranged as one or more modules. With reference to FIG. 3, an embodiment of a binary descriptor generator 40 may include a fetch module 41 coupled to a memory module 42 and an orientation compute module 43. The memory module 42 and the orientation compute module 43 may each be coupled to a compute module 44, which in turn is coupled to a write module 45. The fetch module 41 may be configured to fetch a feature point data set (e.g., from other system memory). The memory module 42 may be configured to locally store the fetched feature point data sets (e.g., typically at least three or more data sets). The orientation compute module 43 may be configured to compute orientation information for each fetched feature point data set. The compute module 44 may be configured to compute the binary descriptor from the feature point data set and the orientation information. The write module 45 may be configured to write the generated descriptors from the compute module 44 to external memory.

In some embodiments, the compute module 44 may be configured to compute first descriptor information based on the computed orientation information and a first locally stored feature point data set. The compute module 44 may operate in parallel with the fetch module 41 and the memory module 42, such that a fetch and local store of a second feature point data set in the memory module 42 occurs in parallel to the compute of the first descriptor information. The compute module 44 may include two or more compute units and the compute module 44 may be configured to compute second descriptor information based on the computed orientation information and the second locally stored feature point data set in parallel with the compute of the first descriptor information. In some embodiments, the compute module 44 may be further configured to compute the second descriptor information based on the computed orientation information and the second stored feature point data set in parallel with both the compute of the first descriptor information and a fetch and local store of a third feature point data set in the memory module 42, and compute third descriptor information for the third locally stored feature point data set in parallel with the compute of the second descriptor information. For example, the memory module 42 may be configured to locally store the fetched feature points in a round robin fashion based on a storage capacity of the memory module 42. The compute module 44 may be configured to compute the first, second, and third descriptor information in a round robin fashion based on a feature point to compute ratio (e.g., a ratio of a number of stored feature point data sets in the memory module 42 to a number of compute units in the compute module 44). For example, the ratio may depend on the time required for fetching the feature point data set and the computing descriptor so that their relative spread is hidden by each other (e.g., for pipelining the processing). In some embodiments, the memory module 42 may include a multi-bank memory arrangement and may interleave banks of the multi-bank memory arrangement based on the feature point data sets.

In some embodiments, the orientation compute module 43 may be configured to compute the orientation information for each fetched feature point data set on the fly. For example, the orientation compute module 43 may be configured to determine a vector X component and a vector Y component of a centroid image moment based on multiplication, addition, and accumulation of pixel data, and look up the orientation information in a table based on the determined vector X and Y components. In some embodiments, the orientation compute module 43 may be further configured to utilize one of a same row index or a same column index to simplify the determination of one of the vector X component or the vector Y component. For a row-major access of the pixel data (e.g., where X coordinates nominally correspond to image row pixel data), for example, the computation of the vector Y component may be simplified because the column index is the same for all of the fetched pixels.

Figure 4:
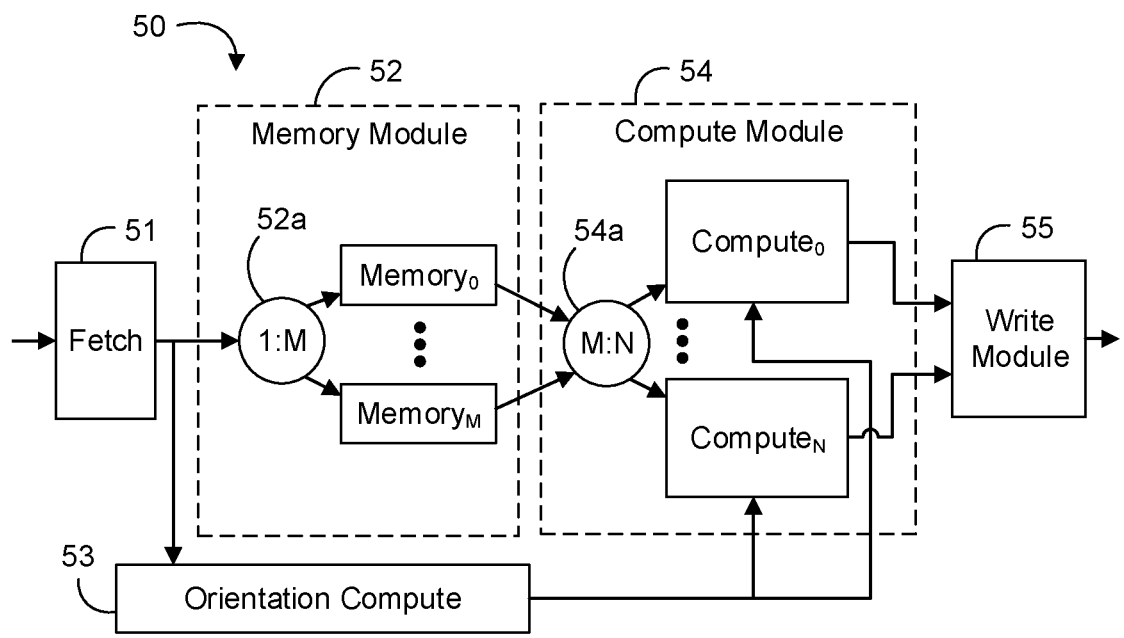
FIG. 4 is a block diagram of another example of a binary descriptor generator according to an embodiment.

With reference to FIG. 4, an embodiment of a binary descriptor generator 50 may include a fetch module 51 coupled to a memory module 52 and an orientation compute module 53. The memory module 52 and the orientation compute module 53 may each be coupled to a compute module 54, which in turn is coupled to a write module 55. The memory module 52 may include storage locations $Memory_0$ through $Memory_M$ (M>1) to locally store a plurality of patches. The compute module 54 may include a plurality of parallel compute units $Compute_0$ through $Compute_N$ (N>0). The write module 55 may be configured to write the generated descriptors from the compute module 54 to external memory. The memory module 52 includes logic 52a to store M feature point data sets in a round robin fashion to the respective storage locations $Memory_0$ through $Memory_M$. The compute module 54 includes logic 54a to compute the descriptor information in a round robin fashion based on the feature point to compute ratio (e.g., M:N).

Given the benefit of the present specification and figures, those skilled in the art will appreciate that the general microarchitecture of the binary descriptor generator 50 may readily be scaled and configured for a wide variety of applications. For example, the type of binary descriptor may vary (e.g., BRISK, FREAK, BRIEF, rBRIEF, etc.), the length of the binary descriptor may vary (e.g., 128 bits, 256 bits, 512 bits, etc.), the number of locally stored patches may vary (e.g., 3 patches, 4 patches, etc.), the number of compute units may vary (e.g., 2 compute units, 3 compute units, etc.) 1), the pixel patch size or receptive field size around the feature point may vary (e.g., 7×7 pixels, 15×15 pixels, 31×31 pixels, etc.), the pixel width or bit depth may vary (e.g., 4 bit, 8 bit, 16 bit, etc.). In some embodiments, one or more (or all) of the foregoing parameters may be fixed for a specific application. In some embodiments, one or more (or all) of the foregoing parameters may be configurable (e.g., to support a wider variety of applications with the same binary descriptor generator).

Figure 5:
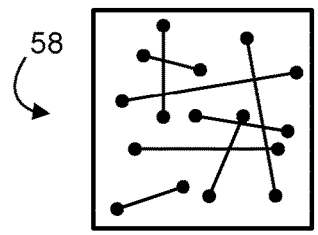
FIG. 5 is an illustrative diagram of an example of a patch according to an embodiment.

With reference to FIG. 5, an embodiment of a patch 58 around a feature point includes various pixels in the neighborhood of the feature point which are indicated as dots in FIG. 5. A line (e.g., or edge) connecting these dots indicates a pair of sampling points. FIG. 5 shows an illustrative example of the nature of typical sampling pairs used in various binary descriptor generators like FREAK, rBRIEF (in ORB descriptor generator). The pixels in a sampling pair are randomly located and typically spread around the patch 58. Accordingly, accessing these pixels in sampling pairs is bandwidth intensive (e.g., accessing each pixel potentially requires a separate memory access) and results in large latency for computing the descriptor in conventional systems.

In the following description, an rBRIEF binary descriptor is considered to facilitate an understanding of the embodiments. However, embodiments of the microarchitecture can be used to generate a wide variety of binary descriptors. In rBRIEF, a patch size of 31×31 pixels around a feature point is used to generate a descriptor. The orientation is computed using the following equations.

$$Cx = \sum_{(xi,yi)} xi \cdot P(xi, yi)$$

$$Cy = \sum_{(xi,yi)} yi \cdot P(xi, yi)$$

$$\theta = \tan^{-1} \frac{Cy}{Cx}$$

Where:
Cx is the X component of a vector pointing to the center of intensity of the patch;
Cy is the Y component of a vector pointing to the center of intensity of the patch;
(xi, yi) are pixel coordinates with respect to the feature point (e.g., the center of the patch, x0, y0);
P(xi, yi) is the pixel value of the pixel at (xi, yi); and
xi and yi range from −15 to +15.

After theta (θ) is computed, theta is used to get orientation corrected sampling pairs, whose intensities are then compared to generate string of 1s and 0s, which is the resulting binary descriptor.

Assuming 8-bit pixels and a 128-bit fetch from memory, if the boundaries of the patch do not align with the fetch line, a worst case 96 accesses are required to fetch an entire patch. As a result, 96 fetch lines are required to compute the orientation, as shown in the above equations. After the orientation is computed, in one approach some embodiments make 512 (256×2) accesses serially to fetch all required pixels to compute a descriptor of size 256-bits. If dual-ported memory is utilized, at the minimum 256 cycles are required.

Figure 6:
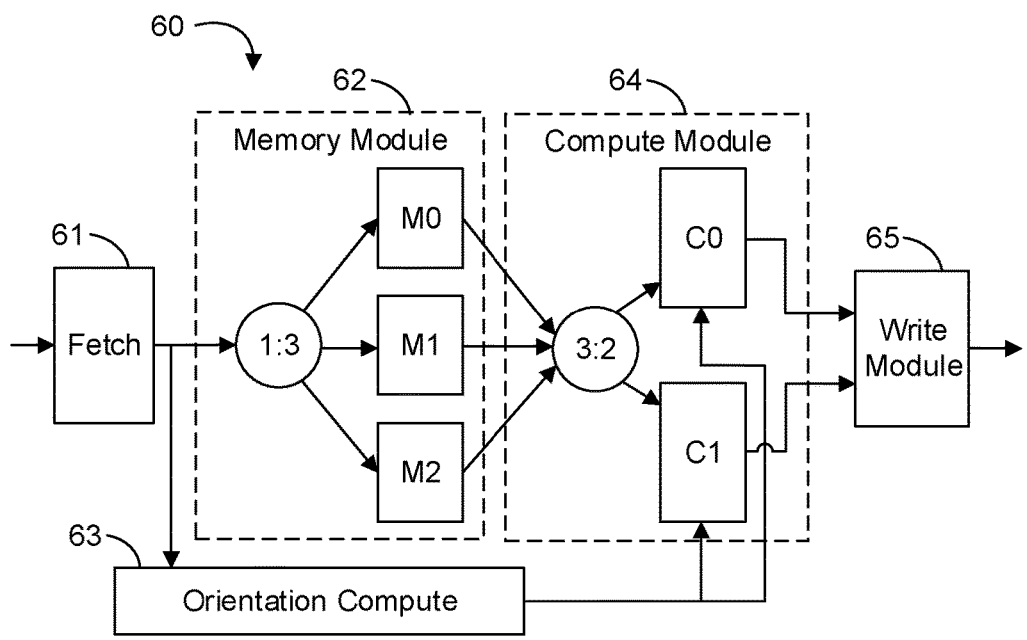
FIG. 6 is a block diagram of another example of a binary descriptor generator according to an embodiment.

With reference to FIG. 6, an embodiment of a binary descriptor generator 60 includes a fetch module 61 coupled to a memory module 62 and an orientation compute module 63. The memory module 62 and the orientation compute module 63 are each coupled to a compute module 64, which in turn is coupled to a write module 65. The memory module 62 includes enough internal storage (e.g., L1 memory) to accommodate three (3) patches corresponding to three feature points (M0, M1, and M2). The compute module 64 includes two parallel compute blocks C0 and C1. The two compute blocks (C0 and C1) work in parallel on two of the patches (either M0, or M1, or M2). The write module 65 writes the generated descriptors from the compute module 64 to external memory.

Figure 7:
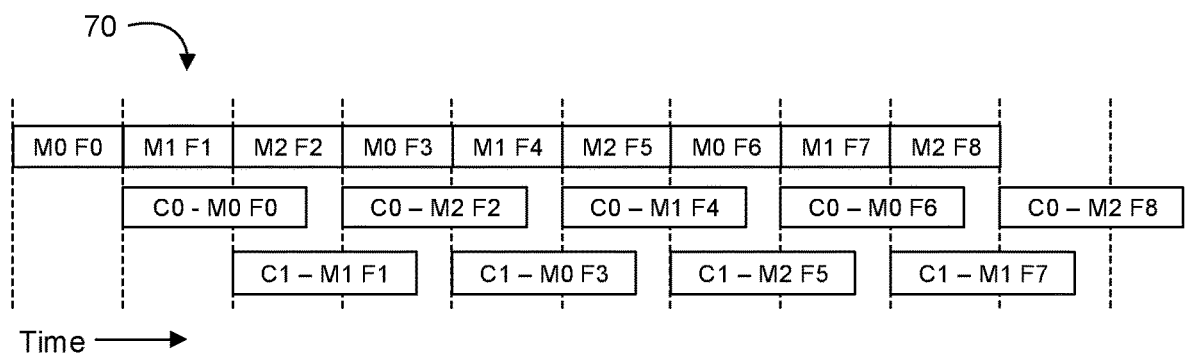
FIG. 7 is an illustrative diagram of an example of a timeline showing parallel operations according to an embodiment.

With reference to FIG. 7, an embodiment of a timeline 70 of descriptor generation for feature points F0 through F8 illustrates the parallel/pipelined operation of the binary descriptor generator 60 from FIG. 6. For example, "M0 F0" represents a fetch of feature point F0 into memory location M0, and "C0-M0 F0" represents a descriptor computation for feature F0, using compute block C0, and accessing the patch from memory location M0. The fetch module 61 fetches patches and the memory module 62 stores the fetched patches in a round-robin fashion into memory locations M0-M2 (e.g., a 1:3 split). The compute blocks C0-C1 then access M0-M2 in 3:2 round-robin fashion to compute descriptors in the following order: C0-M0 F0, C1-M1 F1, C0-M2 F2, C1-M0 F3, and so on.

As shown in the illustrated timeline 70, an embodiment of a 3:2 configuration (patch memory to compute ratio) almost completely hides compute operations behind fetch accesses. Because the patches are locally stored and the orientation is computed on-the-fly, no further memory accesses are required to external memory (e.g., last level cache or DRAM outside of the binary descriptor generator 60) to retrieve pixels for computing a descriptor.

Figure 8:
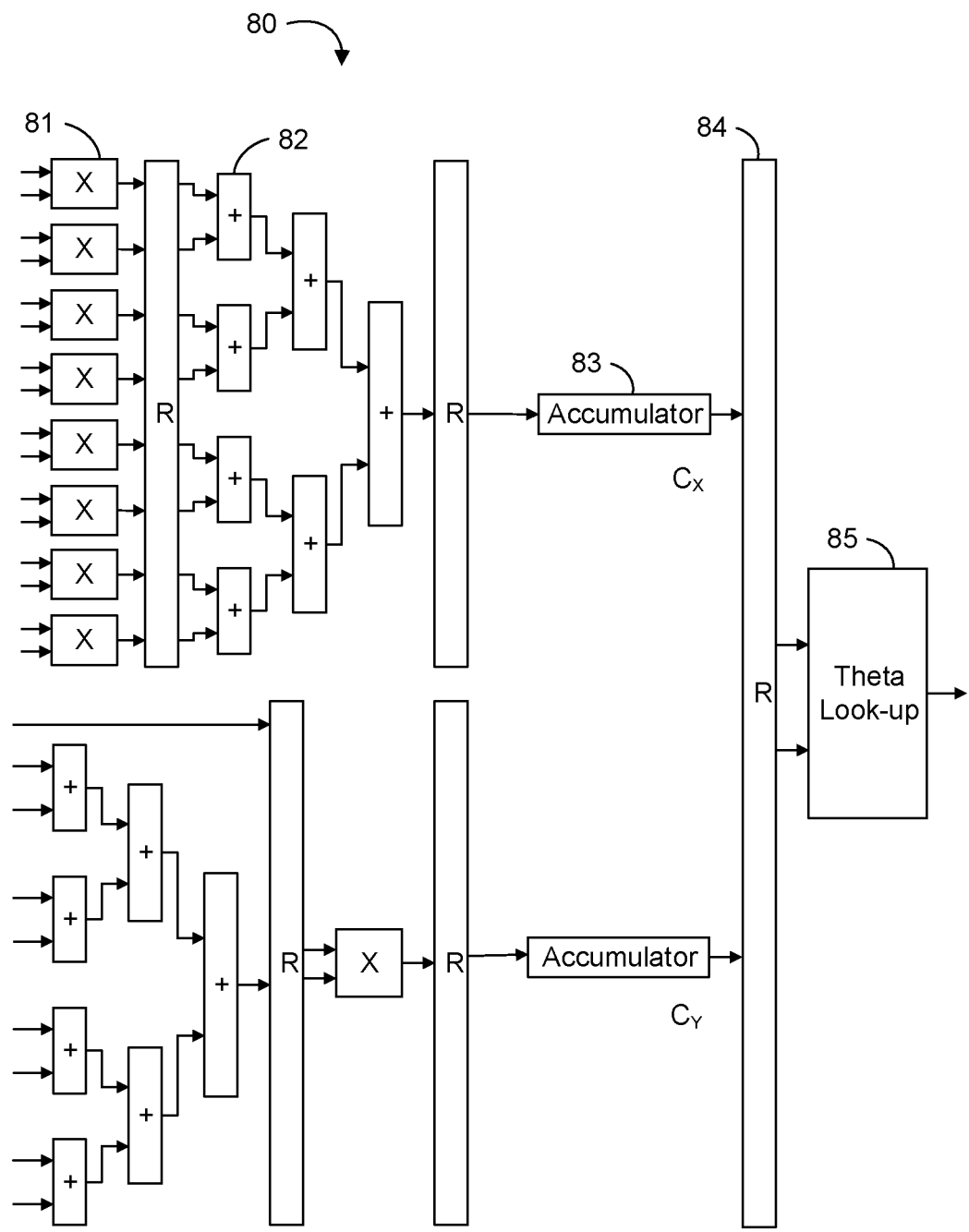
FIG. 8 is a block diagram of an example of an on-the-fly orientation compute module according to an embodiment.

With reference to FIG. 8, an embodiment of an on-the-fly orientation compute module 80 may include multipliers 81 (indicated by an "X" symbol), adders 82 (indicated by a "+" symbol), accumulators 83, registers 84 (indicated by an "R"), and a theta look-up table 85, coupled as shown. Assuming a row-major access of pixels, and each fetch gives 16 pixels. For computing Cx, when 16-pixels are fetched they are multiplied by their corresponding xi value and then reduced to single sum by using tree of adders, followed by an accumulator. In some embodiments, computing Cy may be simplified, because yi is the same for all pixels fetched. If column-major access of pixels is used, Cx is computed similar to that of Cy in row-major, and Cy is computed similar to that of Cx in row-major.

Any suitable storage technology may be utilized for the local memory in the various binary descriptor generators herein (e.g., DRAM, SRAM, latches, buffers, registers, etc.). Some embodiments may utilize dual-ported memory to support the parallel accesses by the fetch and store operations and the compute operations. Because dual-port memories may be relatively expensive, however, some embodiments may utilize a multi-banked memory subsystem for the local memory in a binary descriptor generator.

Figure 9A:
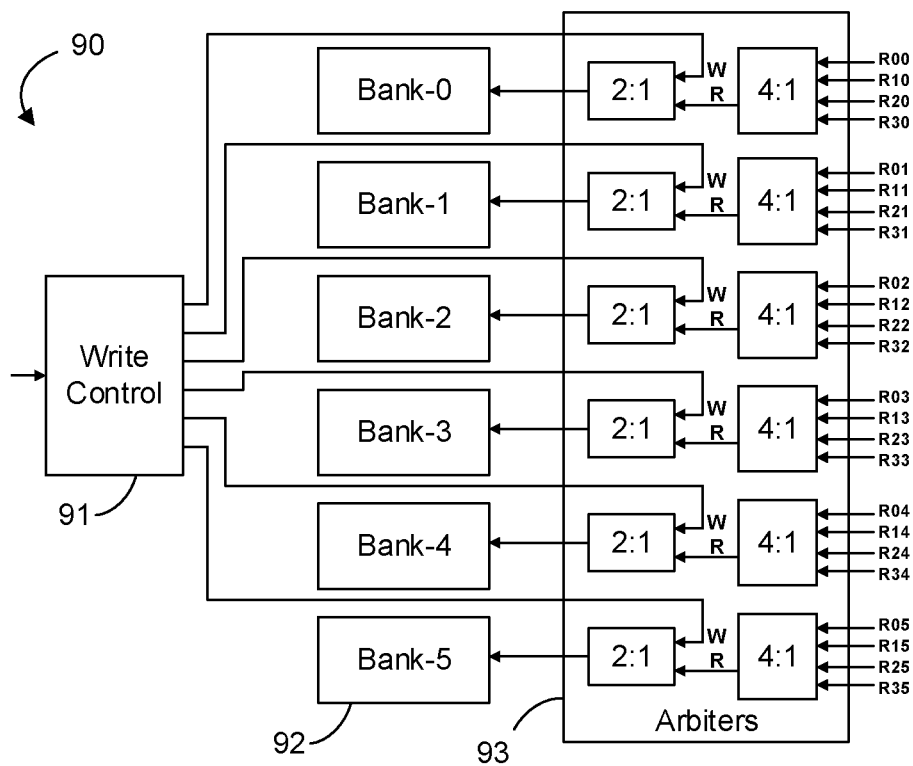
FIGS. 9A to 9B are block diagrams of an example of a multi-bank memory subsystem according to an embodiment.
Figure 9B:
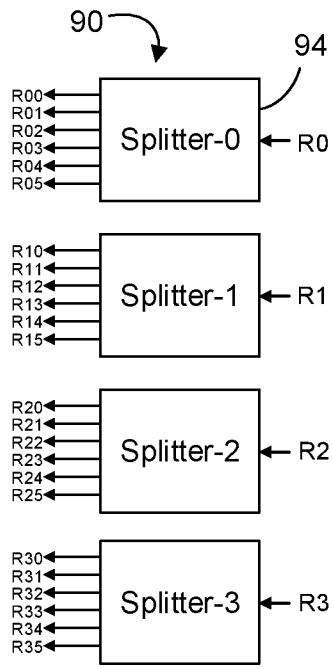

With reference to FIGS. 9A and 9B, an embodiment of a suitable multi-bank memory subsystem 90 may include a write control module 91, a plurality of banks 92 (e.g., Bank-0 through Bank-5), arbiters 93, and a plurality of splitters 94 (e.g., Splitter-0 through Splitter-3), coupled as shown. The six (6) banked memory subsystem 90 may be configured to provide a multi-ported access to the compute blocks, advantageously without the need for a multi-ported SRAM. The banks 92 utilize a patch based interleaving, and each bank has a capacity sufficient to store half of the patch. For example, M0 in FIG. 6 may be split across Bank-0 and Bank-1, M1 may be split across Bank-2 and Bank-3, and so on. The patch-based banking (e.g., pseudo most significant bit (MSB) banking) advantageously avoids any conflicts between writes and reads (e.g., in a single ported memory, both writes and reads are exercised through a same port). At any point of time during execution, the compute blocks C0 and C1 will be working on different pairs of banks, while the fetch module 61 and the memory module 62 will be writing to the remaining two banks.

Figure 10:
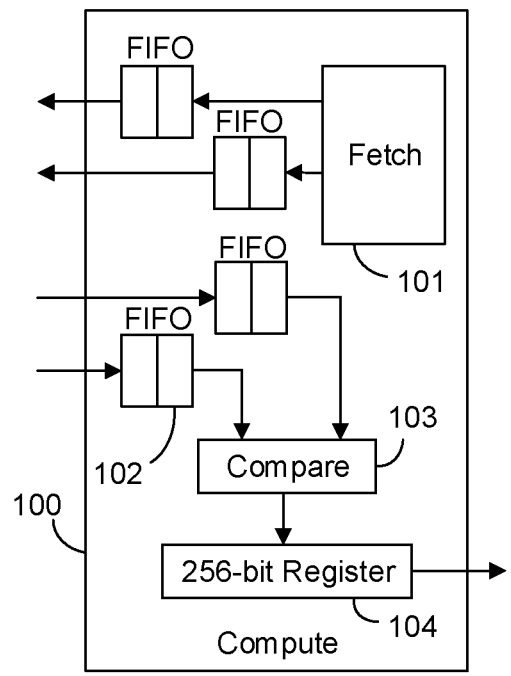
FIG. 10 is a block diagram of an example of a compute block for an rBRIEF binary descriptor according to an embodiment.

The details of the compute modules/blocks depend on the type of binary descriptor to be generated. With reference to FIG. 10, an embodiment of a compute block 100 for an rBRIEF binary descriptor may include fetch logic 101, first-in-first-out (FIFO) buffers 102, compare logic 103, and a 256-bit register 104, coupled as shown. The compute block 100 fetches pixels in various pairs, compares them to generate the descriptor string, and writes the descriptor to external memory. The fetch logic 101 looks-up for the sampling pairs locations, based on the orientation correction, before issuing a read request.

As noted above, the binary descriptor microarchitecture described herein may be readily adapted for a wide variety of different types of binary descriptors. For FREAK descriptor generation, for example, instead of storing pixel values in local memory, the on-the-fly computed integral values will be written to the local memory. Similar to as described in connection with rBRIEF, orientation will be computed during pixel fetch. The rest of the logic remains the same. Because FREAK uses a bigger patch size of 48×48, and stores integral values in the local memory instead of pixel values, more memory is required for storing a single patch of FREAK compared to that of rBRIEF (e.g., nearly 6 times more memory). Due to the increased patch size, a higher number of memory accesses are required. In some embodiments, a 4:3 patch memory to compute ratio may be better suited for FREAK instead of rBRIEF (e.g., using a 3:2 configuration would require more cycles per descriptor computation, resulting in lower performance).

Embodiments of the binary descriptor microarchitecture described herein may provide one or more of the following advantages. The general microarchitecture provides a hardware solution that can be used for wide variety of binary descriptor generators. The design can be dynamically configured to generate different types of binary descriptors, depending on the end-user applications. The microarchitecture achieves improved or best possible throughput (best=minimum number of cycles required for fetching data). This improved or optimum throughput is made possible by hiding both orientation and descriptor compute latency behind fetch latency. Some embodiments may include on-the-fly orientation computation. Orientation computation is an expensive operation, especially in rBRIEF descriptor generation, where all the pixels in the patch are required. A pipelined orientation computation arrangement as shown in FIG. 8, determines all the required computation on-the-fly and hands off the orientation value to the descriptor compute block. Thus, hiding orientation computation latency behind fetch latency. Some embodiments may also include patch-based banking (e.g., pseudo MSB banking). Typically, least significant bit (LSB) banking is used in memory subsystems. LSB banking for descriptor hardware may result in significantly higher local memory access conflicts (e.g., both among reads, as well as between reads and writes) as compared to embodiments of the patch-based banking described herein, especially when single-ported memories are used. The patch-based banking advantageously reduces conflicts between local memory accesses, and completely avoids conflicts between reads and writes.

Figure 11:
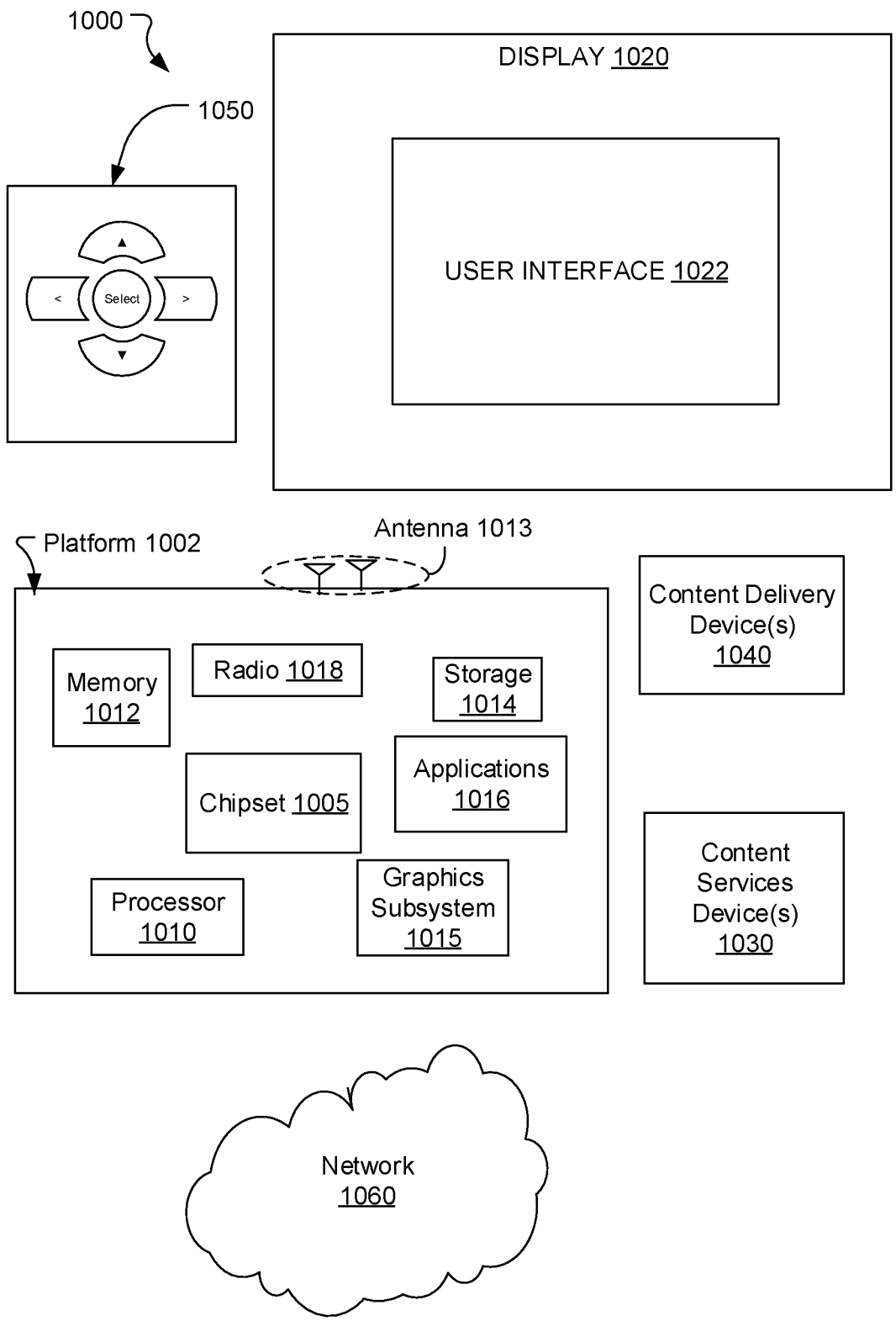
FIG. 11 is an illustrative diagram of an example system.

FIG. 11 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/or display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
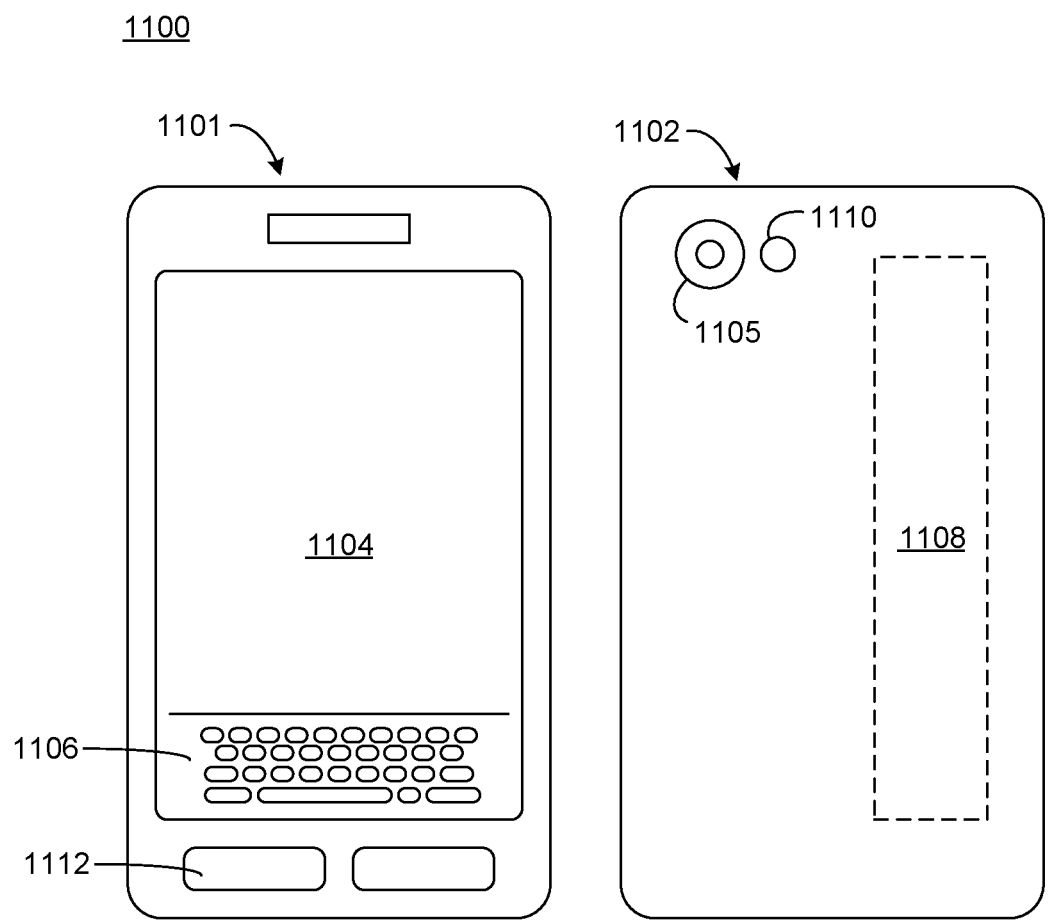
FIG. 12 illustrates an example small form factor device, all arranged in accordance with at least some implementations of the present disclosure.

As described above, system 1000 may be embodied in varying physical styles or form factors. FIG. 12 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the system 10 (FIG. 1), the method 20 (FIGS. 2A to 2C), and/or any of the other embodiments described herein, including those described in the following examples.

Additional Notes and Examples

Example 1 includes an electronic system comprising a local memory, and a processor directly coupled to the local memory, the processor including logic to fetch a feature point data set from outside the local memory, locally store three or more fetched feature point data sets in the local memory, compute orientation information for each fetched feature point data set, compute first descriptor information based on the computed orientation information and a first locally stored feature point data set in parallel with a fetch and local store of a second feature point data set in the local memory, and compute second descriptor information based on the computed orientation information and the second locally stored feature point data set in parallel with the compute of the first descriptor information.

Example 2 includes the system of Example 1, wherein the logic is further to compute the second descriptor information based on the computed orientation information and the second stored feature point data set in parallel with both the compute of the first descriptor information and a fetch and local store of a third feature point data set in the local memory, and compute third descriptor information for the third locally stored feature point data set in parallel with the compute of the second descriptor information.

Example 3 includes the system of Example 2, wherein the logic is further to locally store the fetched feature points in the local memory in a round robin fashion based on a storage capacity of the local memory, and compute the first, second, and third descriptor information in a round robin fashion based on a feature point to compute ratio.

Example 4 includes the system of Example 3, wherein the logic is further to locally store the fetched feature point data sets in a multi-bank memory arrangement for the local memory, and interleave banks of the multi-bank memory arrangement based on the feature point data sets.

Example 5 includes the system of any of Examples 1 to 4, wherein the logic is further to compute the orientation information for each fetched feature point data set on the fly.

Example 6 includes the system of Example 5, wherein the logic is further to determine a first image moment component and a second image moment component based on multiplication, addition, and accumulation of pixel data, and look up the orientation information in a table based on the determined first and second image moment components.

Example 7 includes the system of Example 6, wherein the logic is further to utilize one of a same row index or a same column index to simplify the determination of one of the first image moment component or the second image moment component.

Example 8 includes a method of processing image data comprising fetching a feature point data set from outside a local memory, locally storing three or more fetched feature point data sets in the local memory, computing orientation information for each fetched feature point data set, computing first descriptor information based on the computed orientation information and a first locally stored feature point data set in parallel with a fetch and local store of a second feature point data set in the local memory, and computing second descriptor information based on the computed orientation information and the second locally stored feature point data set in parallel with the compute of the first descriptor information.

Example 9 includes the method of Example 8, further comprising computing the second descriptor information based on the computed orientation information and the second stored feature point data set in parallel with both the compute of the first descriptor information and a fetch and local store of a third feature point data set in the local memory, and computing third descriptor information for the third locally stored feature point data set in parallel with the compute of the second descriptor information.

Example 10 includes the method of Example 9, further comprising locally storing the fetched feature points in the local memory in a round robin fashion based on a storage capacity of the local memory, and computing the first, second, and third descriptor information in a round robin fashion based on a feature point to compute ratio.

Example 11 includes the method of Example 10, further comprising locally storing the fetched feature point data sets in a multi-bank memory arrangement for the local memory, and interleaving banks of the multi-bank memory arrangement based on the feature point data sets.

Example 12 includes the method of any of Examples 8 to 11, further comprising computing the orientation information for each fetched feature point data set on the fly.

Example 13 includes the method of Example 12, further comprising determining a first image moment component and a second image moment component based on multiplication, addition, and accumulation of pixel data, and looking up the orientation information in a table based on the determined first and second image moment components.

Example 14 includes the method of Example 13, further comprising utilizing one of a same row index or a same column index to simplify the determination of one of the first image moment component or the second image moment component.

Example 15 includes at least one machine readable medium comprising a plurality of instructions that, in response to being executed on a computing device, cause the computing device to fetch a feature point data set from outside a local memory, locally store three or more fetched feature point data sets in the local memory, compute orientation information for each fetched feature point data set, compute first descriptor information based on the computed orientation information and a first locally stored feature point data set in parallel with a fetch and local store of a second feature point data set in the local memory, and compute second descriptor information based on the computed orientation information and the second locally stored feature point data set in parallel with the compute of the first descriptor information.

Example 16 includes the machine readable medium of Example 15 comprising a plurality of further instructions that, in response to being executed on the computing device, cause the computing device to compute the second descriptor information based on the computed orientation information and the second stored feature point data set in parallel with both the compute of the first descriptor information and a fetch and local store of a third feature point data set in the local memory, and compute third descriptor information for the third locally stored feature point data set in parallel with the compute of the second descriptor information.

Example 17 includes the machine readable medium of Example 16 comprising a plurality of further instructions that, in response to being executed on the computing device, cause the computing device to locally store the fetched feature points in the local memory in a round robin fashion based on a storage capacity of the local memory, and compute the first, second, and third descriptor information in a round robin fashion based on a feature point to compute ratio.

Example 18 includes the machine readable medium of Example 17 comprising a plurality of further instructions that, in response to being executed on the computing device, cause the computing device to locally store the fetched feature point data sets in a multi-bank memory arrangement for the local memory, and interleave banks of the multi-bank memory arrangement based on the feature point data sets.

Example 19 includes the machine readable medium of any of Examples 15 to 18 comprising a plurality of further instructions that, in response to being executed on the computing device, cause the computing device to compute the orientation information for each fetched feature point data set on the fly.

Example 20 includes the machine readable medium of Example 19 comprising a plurality of further instructions that, in response to being executed on the computing device, cause the computing device to determine a first image moment component and a second image moment component based on multiplication, addition, and accumulation of pixel data, and look up the orientation information in a table based on the determined first and second image moment components.

Example 21 includes the machine readable medium of Example 20 comprising a plurality of further instructions that, in response to being executed on the computing device, cause the computing device to utilize one of a same row index or a same column index to simplify the determination of one of the first image moment component or the second image moment component.

Example 22 includes a binary descriptor generation apparatus comprising a substrate, a local memory coupled to the substrate, and logic coupled to the local memory and the one or more substrates to fetch a feature point data set from outside the local memory, locally store three or more fetched feature point data sets in the local memory, compute orientation information for each fetched feature point data set, compute first descriptor information based on the computed orientation information and a first locally stored feature point data set in parallel with a fetch and local store of a second feature point data set in the local memory, and compute second descriptor information based on the computed orientation information and the second locally stored feature point data set in parallel with the compute of the first descriptor information.

Example 23 includes the apparatus of Example 22, wherein the logic is further to compute the second descriptor information based on the computed orientation information and the second stored feature point data set in parallel with both the compute of the first descriptor information and a fetch and local store of a third feature point data set in the local memory, and compute third descriptor information for the third locally stored feature point data set in parallel with the compute of the second descriptor information.

Example 24 includes the apparatus of Example 23, wherein the logic is further to locally store the fetched feature points in the local memory in a round robin fashion based on a storage capacity of the local memory, and compute the first, second, and third descriptor information in a round robin fashion based on a feature point to compute ratio.

Example 25 includes the apparatus of Example 24, wherein the logic is further to locally store the fetched feature point data sets in a multi-bank memory arrangement for the local memory, and interleave banks of the multi-bank memory arrangement based on the feature point data sets.

Example 26 includes the apparatus of any of Examples 22 to 25, wherein the logic is further to compute the orientation information for each fetched feature point data set on the fly.

Example 27 includes the apparatus of Example 26, wherein the logic is further to determine a first image moment component and a second image moment component based on multiplication, addition, and accumulation of pixel data, and look up the orientation information in a table based on the determined first and second image moment components.

Example 28 includes the apparatus of Example 27, wherein the logic is further to utilize one of a same row index or a same column index to simplify the determination of one of the first image moment component or the second image moment component.

Example 29 includes a binary descriptor generation apparatus comprising means for fetching a feature point data set from outside a local memory, means for locally storing three or more fetched feature point data sets in the local memory, means for computing orientation information for each fetched feature point data set, means for computing first descriptor information based on the computed orientation information and a first locally stored feature point data set in parallel with a fetch and local store of a second feature point data set in the local memory, and means for computing second descriptor information based on the computed orientation information and the second locally stored feature point data set in parallel with the compute of the first descriptor information.

Example 30 includes the apparatus of Example 29, further comprising means for computing the second descriptor information based on the computed orientation information and the second stored feature point data set in parallel with both the compute of the first descriptor information and a fetch and local store of a third feature point data set in the local memory, and means for computing third descriptor information for the third locally stored feature point data set in parallel with the compute of the second descriptor information.

Example 31 includes the apparatus of Example 30, further comprising means for locally storing the fetched feature points in the local memory in a round robin fashion based on a storage capacity of the local memory, and means for computing the first, second, and third descriptor information in a round robin fashion based on a feature point to compute ratio.

Example 32 includes the apparatus of Example 31, further comprising means for locally storing the fetched feature point data sets in a multi-bank memory arrangement for the local memory, and means for interleaving banks of the multi-bank memory arrangement based on the feature point data sets.

Example 33 includes the apparatus of any of Examples 29 to 32, further comprising means for computing the orientation information for each fetched feature point data set on the fly.

Example 34 includes the apparatus of Example 33, further comprising means for determining a first image moment component and a second image moment component based on multiplication, addition, and accumulation of pixel data, and means for looking up the orientation information in a table based on the determined first and second image moment components.

Example 35 includes the apparatus of Example 34, further comprising means for utilizing one of a same row index or a same column index to simplify the determination of one of the first image moment component or the second image moment component.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:
1. An electronic system, comprising:
a local memory; and
a processor directly coupled to the local memory, the processor including logic to:
  fetch a feature point data set from outside the local memory,
  locally store three or more fetched feature point data sets in the local memory,
  compute orientation information for each fetched feature point data set,
  compute first descriptor information based on the computed orientation information and a first locally stored feature point data set in parallel with a fetch and local store of a second feature point data set in the local memory,
  compute the second descriptor information based on the computed orientation information and the second locally stored feature point data set in parallel with both the compute of the first descriptor information and a fetch and local store of a third feature point data set in the local memory, and
  compute third descriptor information for the third locally stored feature point data set in parallel with the compute of the second descriptor information.

2. The system of claim 1, wherein the logic is further to:
locally store the fetched feature points in the local memory in a round robin fashion based on a storage capacity of the local memory; and
compute the first, second, and third descriptor information in a round robin fashion based on a feature point to compute ratio.

3. The system of claim 2, wherein the logic is further to:
locally store the fetched feature point data sets in a multi-bank memory arrangement for the local memory; and
interleave banks of the multi-bank memory arrangement based on the feature point data sets.

4. An electronic system, comprising:
a local memory; and
a processor directly coupled to the local memory, the processor including logic to:
  fetch a feature point data set from outside the local memory,
  locally store three or more fetched feature point data sets in the local memory,
  compute orientation information for each fetched feature point data set on the fly,
  compute first descriptor information based on the computed orientation information and a first locally stored feature point data set in parallel with a fetch and local store of a second feature point data set in the local memory, compute second descriptor information based on the computed orientation information and the second locally stored feature point data set in parallel with the compute of the first descriptor information, determine a first image moment component and a second image moment component based on multiplication, addition, and accumulation of pixel data, and look up the orientation information in a table based on the determined first and second image moment components.

5. The system of claim 4, wherein the logic is further to: utilize one of a same row index or a same column index to simplify the determination of one of the first image moment component or the second image moment component.

6. A method of processing image data, comprising:
fetching a feature point data set from outside a local memory;
locally storing three or more fetched feature point data sets in the local memory;
computing orientation information for each fetched feature point data set;
computing first descriptor information based on the computed orientation information and a first locally stored feature point data set in parallel with a fetch and local store of a second feature point data set in the local memory;
computing the second descriptor information based on the computed orientation information and the second locally stored feature point data set in parallel with both the compute of the first descriptor information and a fetch and local store of a third feature point data set in the local memory; and
computing third descriptor information for the third locally stored feature point data set in parallel with the compute of the second descriptor information.

7. The method of claim 6, further comprising:
locally storing the fetched feature points in the local memory in a round robin fashion based on a storage capacity of the local memory; and
computing the first, second, and third descriptor information in a round robin fashion based on a feature point to compute ratio.

8. The method of claim 7, further comprising:
locally storing the fetched feature point data sets in a multi-bank memory arrangement for the local memory; and
interleaving banks of the multi-bank memory arrangement based on the feature point data sets.

9. A method of processing image data, comprising: fetching a feature point data set from outside a local memory; locally storing three or more fetched feature point data sets in the local memory; computing orientation information for each fetched feature point data set on the fly; computing first descriptor information based on the computed orientation information and a first locally stored feature point data set in parallel with a fetch and local store of a second feature point data set in the local memory; computing second descriptor information based on the computed orientation information and the second locally stored feature point data set in parallel with the compute of the first descriptor information; determining a first image moment component and a second image moment component based on multiplication, addition, and accumulation of pixel data; and looking up the orientation information in a table based on the determined first and second image moment components.

10. The method of claim 9, further comprising: utilizing one of a same row index or a same column index to simplify the determination of one of the first image moment component or the second image moment component.

11. At least one non-transitory machine readable medium comprising a plurality of instructions that, in response to being executed on a computing device, cause the computing device to:
fetch a feature point data set from outside a local memory;
locally store three or more fetched feature point data sets in the local memory;
compute orientation information for each fetched feature point data set;
compute first descriptor information based on the computed orientation information and a first locally stored feature point data set in parallel with a fetch and local store of a second feature point data set in the local memory;
compute the second descriptor information based on the computed orientation information and the second locally stored feature point data set in parallel with both the compute of the first descriptor information and a fetch and local store of a third feature point data set in the local memory; and
compute third descriptor information for the third locally stored feature point data set in parallel with the compute of the second descriptor information.

12. The machine readable medium of claim 11, comprising a plurality of further instructions that, in response to being executed on the computing device, cause the computing device to:
locally store the fetched feature points in the local memory in a round robin fashion based on a storage capacity of the local memory; and
compute the first, second, and third descriptor information in a round robin fashion based on a feature point to compute ratio.

13. The machine readable medium of claim 12, comprising a plurality of further instructions that, in response to being executed on the computing device, cause the computing device to:
locally store the fetched feature point data sets in a multi-bank memory arrangement for the local memory; and
interleave banks of the multi-bank memory arrangement based on the feature point data sets.

14. At least one non-transitory machine readable medium comprising a plurality of instructions that, in response to being executed on a computing device, cause the computing device to:
fetch a feature point data set from outside a local memory;
locally store three or more fetched feature point data sets in the local memory;
compute orientation information for each fetched feature point data set on the fly;
compute first descriptor information based on the computed orientation information and a first locally stored feature point data set in parallel with a fetch and local store of a second feature point data set in the local memory;
compute second descriptor information based on the computed orientation information and the second locally stored feature point data set in parallel with the compute of the first descriptor information;

determine a first image moment component and a second image moment component based on multiplication, addition, and accumulation of pixel data; and look up the orientation information in a table based on the determined first and second image moment components.

15. The machine readable medium of claim 14, comprising a plurality of further instructions that, in response to being executed on the computing device, cause the computing device to:

utilize one of a same row index or a same column index to simplify the determination of one of the first image moment component or the second image moment component.

* * * * *